United States Patent [19]

Hopkins, Jr. et al.

[11] 4,015,246

[45] Mar. 29, 1977

[54] SYNCHRONOUS FAULT TOLERANT MULTI-PROCESSOR SYSTEM

[75] Inventors: Albert L. Hopkins, Jr., Cambridge; Thomas Basil Smith, III, Sudbury, both of Mass.

[73] Assignee: The Charles Stark Draper Laboratory, Inc., Cambridge, Mass.

[22] Filed: Apr. 14, 1975

[21] Appl. No.: 567,629

[52] U.S. Cl. .................. 340/172.5; 340/146.1 BE
[51] Int. Cl.² .................. G06F 11/00; G06F 13/00; G06F 15/16; G06F 3/00
[58] Field of Search ........ 340/172.5, 147 R, 147 C, 340/146.1 BE; 444/1

[56] References Cited

UNITED STATES PATENTS

| | | | |
|---|---|---|---|
| 3,510,844 | 5/1970 | Aranyl et al. | 340/172.5 |
| 3,560,935 | 2/1971 | Beers | 340/172.5 |
| 3,651,473 | 3/1972 | Faber | 340/172.5 |
| 3,665,418 | 5/1972 | Bouricious et al. | 340/172.5 |
| 3,680,058 | 7/1972 | De Santis et al. | 340/172.5 |
| 3,735,356 | 5/1973 | Yates | 340/172.5 |
| 3,750,110 | 7/1973 | Martin et al. | 340/172.5 |
| 3,761,879 | 9/1973 | Brandsma et al. | 340/172.5 |
| 3,787,818 | 1/1974 | Arnold et al. | 340/172.5 |
| 3,810,114 | 5/1974 | Yamada et al. | 340/172.5 |
| 3,876,987 | 4/1975 | Dalton et al. | 340/172.5 |
| 3,882,455 | 5/1975 | Heck et al. | 340/172.5 X |

*Primary Examiner*—Gareth D. Shaw
*Assistant Examiner*—Melvin B. Chapnick
*Attorney, Agent, or Firm*—Donald Brown; Robert F. O'Connell

[57] ABSTRACT

A bus guardian unit for a system in which processors, memories and other units are not grouped together physically but where any plurality of identical units e.g., three, can be made to operate in synchronism as though they were grouped together. Each unit would potentially be able to deliver data to any one of a number of buses and each of the three units operating in synchronism would normally deliver data to a different bus. Units accepting data from the bus system use data from three buses to determine the majority consensus of a triplet. The invention also allows idle units to be unpowered until needed either as replacements for failed units or else to provide extra computational capacity for system mission phases requiring same.

4 Claims, 3 Drawing Figures

SYNCHRONOUS FAULT TOLERANT MULTI-PROCESSOR SYSTEM

BACKGROUND OF THE DISCLOSURE

This invention is directed to the problem of designing a computer system that will continue to be able to exercise control despite the occurrence of a component fault. There are numerous applications where computer survival is critical, including military, space, and transportation applications. There are others where computers would be used if they were more dependable, including medical, and nuclear applications.

The earliest approach to enhanced computer system reliability was to have two or three computers each capable of control, and to switch from one to another when one failed. The problem is how to find out that one has failed, and to be able to restart the job on the next computer. Another approach has been to have two computers running in synchronism.

They will disagree when one has failed, thus solving the first part of the problem. Still another approach, three in synchronism, will not only show disagreement when one has failed but will indicate which one it was. The latter principle was employed by the Saturn V Launch Vehicle Digital Computer in the mid 1960's.

Another approach to the problem is to use coded representations for data that will be altered in an identifiable manner by any component fault. This has been used in various projects, notable the JPL STAR computer designed and built at the Jet Propulsion Laboratory. This approach is designed to avoid the expense of replicating to detect and correct faults. The disadvantages are that many non-standard circuits must be designed, manufactured, and understood by maintenance personnel, and also that it is difficult to verify at an arbitrary instant of time that all of the assumed protection is indeed present and in working order.

There are various ways in which one can employ the triple-redundancy principle. One is to triplicate small parts of a computer and vote on every input to each part. This is characteristic of the Saturn V computer design. Another way is to triplicate an entire system and vote on all inputs to the system. This represents an extreme measure, rather than a practical approach.

There are other more realistic approaches in which parts of the system are triplicated with voting at chosen points. Some systems, notable for aircraft, have used more than three of each part of a system in order to achieve immunity to more than one failure.

Another proposal was a computer system composed of numerous small processors and memory modules interconnected by a time-shared bus, in which three units operate together to perform a part of the total system job. Any triplet can fail, in which case the failure will be detected and the information necessary for restart will be salvaged and passed along to another triplet on the first occasion when another triplet is available.

Yet another approach was suggested, which comprised a group of individual non-redundant units each connected to a common bus system. The shortcoming with both of the last approaches has been that no mechanism had been devised that would allow units to be connected to the bus in such a way that they could be disconnected and reconnected when necessary despite the presence of faults, and that this ability to disconnect and reconnect could be dynamically verified.

Without this, there was the possibility that a single failure would either bring down the entire system, or else would go undetected until a second failure occurred which, together with the first, would bring down the system. In either case the desired fault tolerance is not achieved.

The invention presented here departs from the above in that it allows data connections to be reliably made and broken between processor, memory units, etc., and members of a redundant bus. Such connections can be changed only by two or three processors acting in synchronism. No single processor can change its own connection status, nor that of any other unit.

When a unit persistently disagrees with its assigned partners, it will have its power switched off and will be logically disconnected from the system, by other, correctly functioning, processors acting in synchronism.

BRIEF DESCRIPTION OF THE DISCLOSURE

This invention discloses a bus guardian unit for an ultra reliable computer system, said bus guardian unit being adapted to listen to signals from a plurality of processors, etc., and act in response to same to control the connection of a processor, memory, etc., to a particular bus of a plurality of buses.

In addition, the disclosure herein illustrates the utilization of a pair of bus guardian units connected to provide added reliability when used to control the access of a processor, memory, etc., to a bus.

An additional feature of this disclosure is the use of a bus guardian unit to turn off the power of a processor, memory, etc., in the event of a detected failure thereof based on instructions provided to the bus guardian unit from other processors.

DETAILED DESCRIPTION OF THE DISCLOSURE

Figure 1:
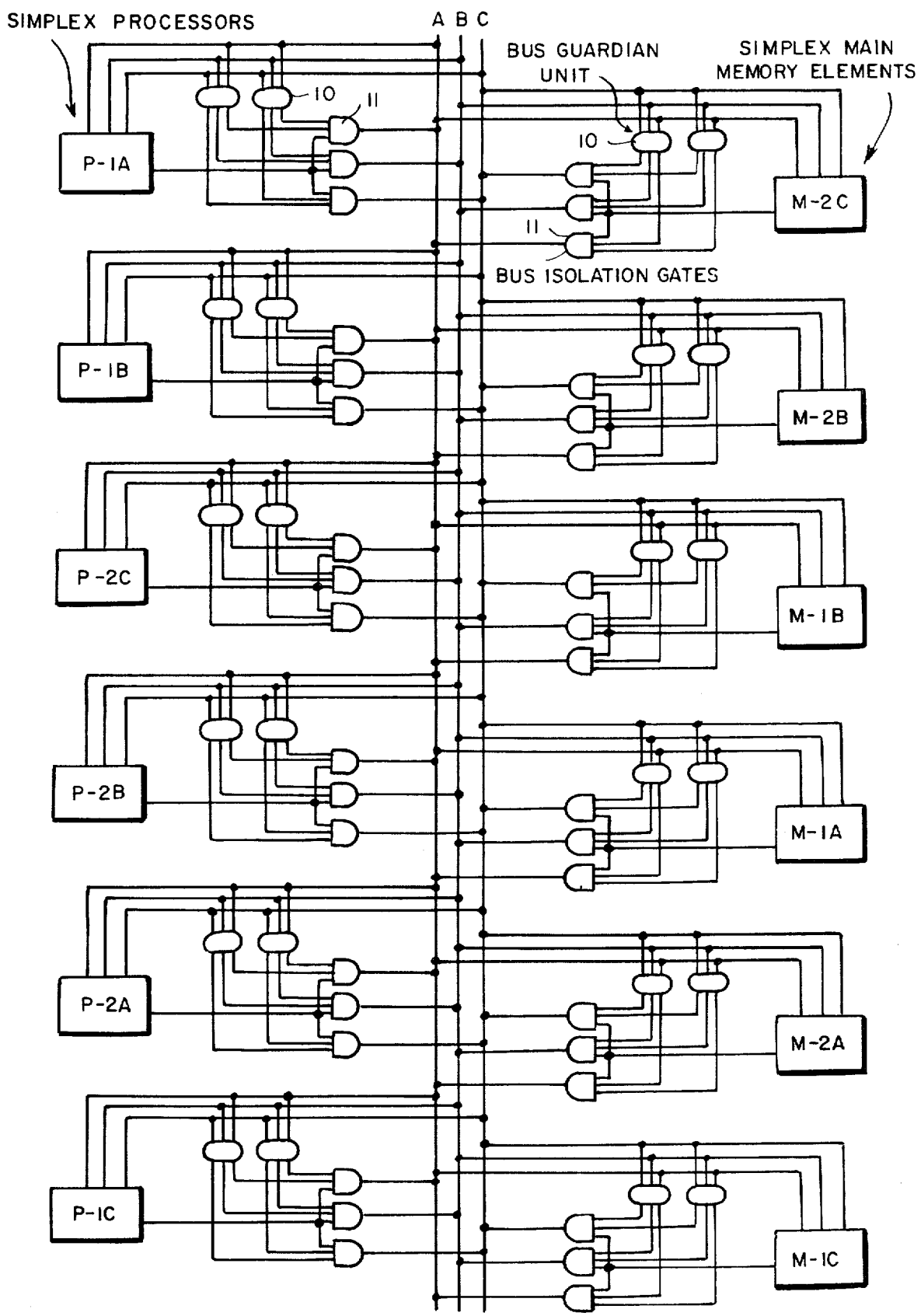
FIG. 1 illustrates in block form an overview of a computer, memory, bus system employing the bus guardian units according to the disclosure.
Figure 2:
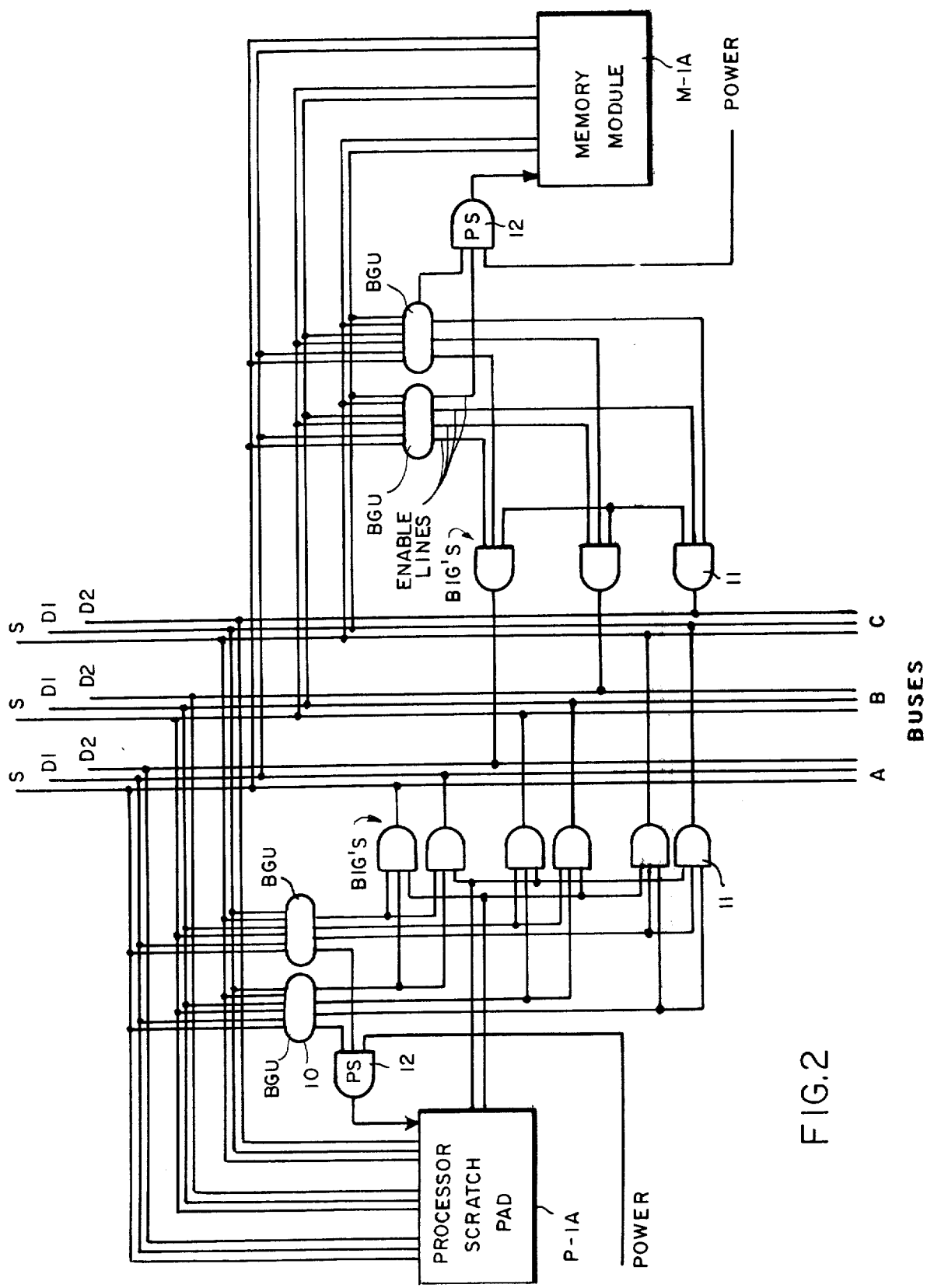
FIG. 2 illustrates in block form an expanded view of a single processor/scratch pad and memory module in a bus system which employs bus guardian units according to the disclosure with power switch.

Reference should now be had to FIGS. 1 and 2 which illustrate a fault tolerant computer system to set the stage for the invention. The buses of the system are labeled A, B and C. Each bus normally comprises two data lines D1 and D2 and one sync line S (see FIG. 2).

Processors P-1A, P-1B, P-1C, P-2A, P-2B and P-2C have access to the D1 and S lines using them for data transmission and bus control. Memory units M-1A, M-1B, M-1C M-2A, M-2B and M-2C have access to only the D2 lines and use them for the data transfers from memory to the processors. All three lines of each bus operate as wired OR lines; a line being high if any unit is pulling the line high. A complete schematic of this system is shown in FIG. 1 and clock lines (not shown) well known in the art distribute clock throughout the system and are also used to clock individual data bits on the bus. A suitable clock for a fault tolerant system is disclosed on pages 17 to 22 of a Digest of Papers, The State of The Art From Device Testing to Reconfigurable Systems FTC/3, 73, International Symposium on FAULT-TOLERANT COMPUTING, June 20–21–22, Palo Alto, Calif. by Daly, Hopkins and McKenna. Copyright 1973 by the Institute of Electrical and Electronics Engineers, Inc.

The nominal clock and bus data rate may be 20 megahertz. The sync line, S, is used in conjunction with the data line D1 to indicate start and end of transaction. The processor triad, e.g., P-1A, P-1B and P-1C of P-2A, P-2B and P-2C controlling the bus may indicate an end of transaction by holding both the D1 and S high for one bit period, and then dropping the D1 line to zero while continuing to hold S high.

It continues to hold the S line high until other processor triads wish to use the bus. Those triads then raise D1 high. This S-high D1-low followed by S-high D1-high is a major sync which signals the beginning of transaction and the next eight clock periods are devoted to competition for the bus. See U.S. Pat. No. 3,710,351 issued Jan. 9, 1973, which discloses bus competition in a computer system.

Processors desiring access to the bus signal beginning of transaction and then lower the S line to zero and begin to place their triad identifications onto the D1 line, one bit at a time starting with the highest order bits. After each bit, each competing processor triad compares the D1 data read in from the bus with the signal it tried to place on the bus.

If they disagree, those processors that tried to place zero drop out of the poll. After eight bit periods, this competition spells out the eight bit code of the next triad to use the bus. A message or series of messages from the controlling processor then follows, forming the text of the transaction.

The beginning of each message is signaled by a minor sync, S-high D1-low. The first four bits of each message are used to designate the message type. The message content then follows and its format is of course dependent on the type of message.

Multiple messages need not be tightly packed as the minor sync synchronizes the transmission and reception of each message in a series. The bus may be idle between messages and the processor still retains control of the bus. A transaction is terminated normally when the controlling processor signals an end of transaction.

Memory units can transmit only one type of message, a response to a request for data. This response is transmitted on the D2 bus lines. Each message may be 33 bits long and comprises a leading 1 followed by 32 bits of data, the content of one memory word. The leading 1 bit serves to align the incoming data as these messages may have idle space between adjoining messages. Note that since the D2 line is completely independent of the D1 and S lines, processor and memory originated messages may overlap.

All receiving devices examine the first four bits of a processor originated message. If the message type indicates that the message is directed toward it, the device processes the additional trailing bits using the applicable message format for that particular message type. Specifically, messages may be directed toward a simplex processor (0000), toward a simplex memory unit (0001), toward a bus guardian unit or BGU (0010), or toward a memory triad.

Messages directed toward a memory triad, e.g., M-1A, M-1B, and M-1C are either a request for data (1000) or a store data command (0100).

The general message format is shown as follows:

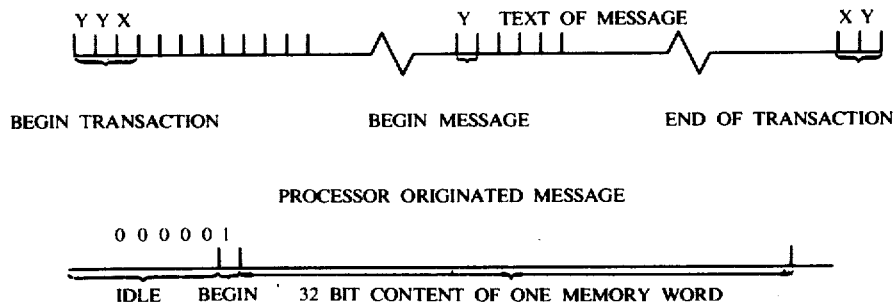

compares the D1 data read in from the bus with the signal it tried to place on the bus.

Basically, the control of the system configuration and the manipulation of the status of individual units of the system is accomplished by means of a triad of processors directing a manipulating command toward the various units or triads in the system.

It should also be understood that additional spares i.e., processor or memory units may be included in the system and may be switched into the system to form a triad in the event that one or more of the processor or memory units were to be disabled as will be described below.

Since the above overall description serves merely as a setting for the placement of the bus guardian units of this invention, no further detail will be disclosed.

In FIGS. 1 and 2 the bus guardian units are shown at 10. In the preferred form of the invention, the bus guardian units (BGU) 10 are replicated to reduce the likelihood of a catastrophic failure of the enabling logic so as to prevent simultaneous enabling of all bus isolation gates (BIG) 11 which would thus allow a single processor to act as a triad of processors.

As shown in FIG. 2 the bus guardian units are coupled to each of the bus data lines and sync lines and include listening logic for listening to information on these lines. The bus listening logic also includes logic for recognizing and responding to legitimate commands from processor triads. Each of the bus guardian units provides control signals to limit the access of the memory or processor which it controls, to one bus at a time so that outgoing data from that memory or processor is only transmitted on one bus at a time.

In order to control the processor access to the buses by the bus guardian units 10, there are provided six bus isolator "AND" gates 11, one for each bus data line D1 and one for each sync line S, as shown in FIG. 2.

The gates 11 preferably have failure modes biased toward fail open, thus reducing the probability of catastrophic failure of this component.

The replicated bus guardian units 10 each provide inputs to bus isolator gates 11 to control the flow of data from the processor P-1A (see FIG. 2) to data line D1 and the flow of sync signals to the sync line S.

On the memory side (see memory module M-1A) only three bus isolator gates are used inasmuch as all memory units transmit only on D2 lines.

As a further feature the bus guardian units also provide a suitable mechanism for shutting down the processor/scratch pads (temporary memory or storage) as well as the memories. As a preferred feature the bus guardian units may include a fourth enabling line used to control a power switch 12 through which power is applied to the processor or memory units.

The inclusion of power switches 12 provides both a convenient mechanism for saving power as well as a backup mechanism for the bus isolator gates 11.

Figure 3:
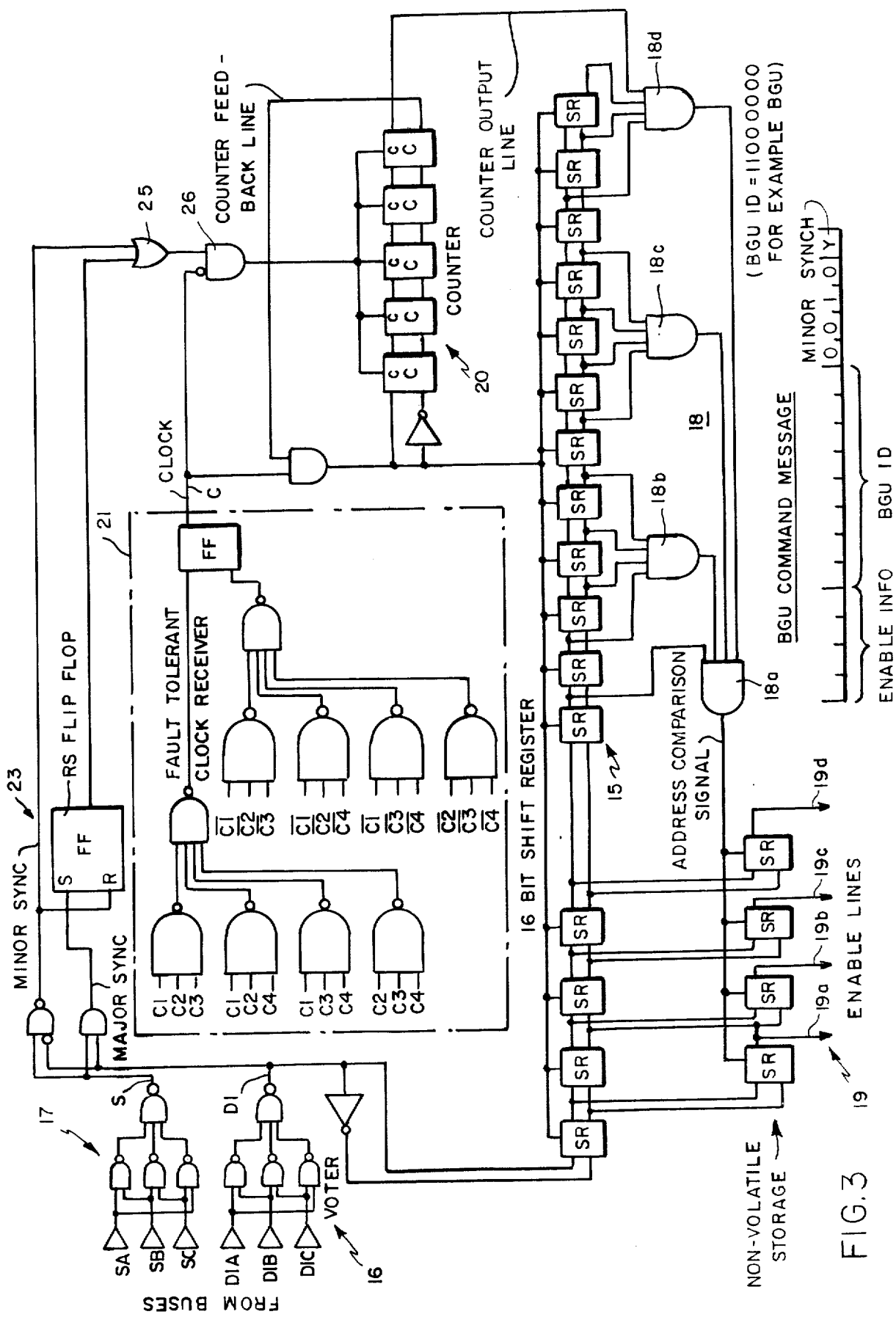
FIG. 3 is a logic diagram of a bus guardian unit according to the disclosure.

Reference should now be had to FIG. 3 which shows a logic diagram of a preferred form of a bus guardian unit (BGU). In particular the bus guardian unit system comprises a sixteen bit shift register shown at 15. The shift register 15 receives data from the bus data lines D1A, D1B, and D1C through a voter network 16 comprising four "NAND" gates coupled together to provide a majority consensus, D1, of the data on these three lines at the output of the voter 16.

Similarly, the voter network 17 provides at its output a signal S which represents the majority consensus of the sync signals on bus lines SA, SB and SC.

The logic circuitry 23 acts on the major and minor sync signals disclosed above. An R-S flip-flop produces an output signal which is set by major sync and reset by the first subsequent minor sync.

The fault tolerant clock receiver 21 provides at its output a 20 megahertz clock signal C. Any other clock may be used for purposes of description as the bus guardian principle is independent of the fault tolerant characteristics of the clock. An example of a fault tolerant clock receiver is shown in the magazine Digital Design Volume 3, Number 10, Oct. 1973, pages 56 and 58.

A counter shown at 20 counts clock pulses C. The counter is reset to zero in between clock pulses by logic gates 25 and 26 during minor sync pulses and during the interval between a major sync pulse and the first following minor sync pulse.

When the counter 20 reaches a value of 16 a counter-feed back line inhibits further counting and an output line enables a comparison of the message identifier bits.

An identifier decoder 18 comprising hardwired and uniquely wired AND gates 18-a, 18-b, 18-c and 18-d are provided to look at bits 1-12 and determine if the message or information on the buses is directed to this particular bus guardian unit. As shown in this case, if the bits are 110000000100, then the address comparison signal at the output of the gate 18-a will be high, and will cause gating of bits 13 to 16 into the storage flip-flops 19.

In this case the rightmost four bits indicate that the message is intended for a BGU, and the next eight bits indicate that the information is directed to this particular BGU.

Three of the bits in this storage via enable lines 19a-c are then used to enable or disable the bus isolator gates to control access of the memory or processor to a particular data line. The fourth bit of storage via one enable line 19d is used to control power to the memory or processor unit as previously discussed. The configuration of these four bits is established by the processor triad that transmitted the 16 bit message.

Normally, only one output from the three BGU enable lines coupling to the bus isolation gates (BIG) will be high, thereby restricting access from the memory or processor unit to a single bus. By extending the number of control bits and enabling lines, the number of buses or other devices which may be controlled may be extended, by providing additional hardware equivalent to that shown.

We claim:

1. In a synchronous fault tolerant multi-processor system which includes at least three buses, at least six processors, each processor coupled to each of the buses, at least two redundant bus guardian units for each processor, each bus guardian unit coupled to each of said buses, and a plurality of bus isolation gates, at least three gates coupled to each one of said processors and to said two bus guardian units for each respective processor, each of said three gates per processor coupled to a different one of said buses, said bus guardian units receiving messages only from said buses and providing output signals to control said gates in order to permit or deny transmission of messages from each of said processors to said buses.

2. The system of claim 1 in which said bus guardian unit controls the power to the processor.

3. The system of claim 1 in which said bus guardian units each contain means for receiving messages from said buses and for determining if a particular message is addressed to it.

4. In a synchronous fault tolerant multiprocessor system which includes at least three buses, at least six memory elements, each memory element coupled to each of the buses, at least two redundant bus guardian units for each memory element, each bus guardian unit coupled to each of said buses, and a plurality of bus isolation gates, at least three gates coupled to each one of said memory elements and to said two bus guardian units for each respective memory element, each of said three gates per memory element coupled to a different one of said buses, said bus guardian units receiving messages only from said buses and providing output signals to control said gates in order to permit or deny transmission of messages from each of said memory elements to said buses.

* * * * *